(12) United States Patent
Barkan

(10) Patent No.: US 12,003,514 B2
(45) Date of Patent: Jun. 4, 2024

(54) PROGRAM VERIFICATION AND MALWARE DETECTION

(71) Applicant: Mordecai Barkan, Palo Alto, CA (US)

(72) Inventor: Mordecai Barkan, Palo Alto, CA (US)

(*) Notice: Subject to any disclaimer, the term of this patent is extended or adjusted under 35 U.S.C. 154(b) by 768 days.

(21) Appl. No.: 16/858,683

(22) Filed: Apr. 26, 2020

(65) Prior Publication Data

US 2020/0322364 A1 Oct. 8, 2020

Related U.S. Application Data

(63) Continuation-in-part of application No. 15/675,611, filed on Aug. 11, 2017, now Pat. No. 11,223,634, which is a continuation of application No. 15/061,878, filed on Mar. 4, 2016, now Pat. No. 9,781,141, which is a continuation of application No. 14/517,636, filed on Oct. 17, 2014, now Pat. No. 9,342,695, which is a continuation-in-part of application No. 14/040,352, filed on Sep. 27, 2013, now Pat. No. 9,092,628.

(60) Provisional application No. 61/961,547, filed on Oct. 18, 2013, provisional application No. 61/744,677, filed on Oct. 2, 2012.

(51) Int. Cl.
| | |
|---|---|
| H04L 29/06 | (2006.01) |
| G06F 21/55 | (2013.01) |
| G06F 21/56 | (2013.01) |
| G06F 21/57 | (2013.01) |
| H04L 9/40 | (2022.01) |
| H04W 12/128 | (2021.01) |
| H04W 4/44 | (2018.01) |

(52) U.S. Cl.
CPC ........ *H04L 63/1416* (2013.01); *G06F 21/554* (2013.01); *G06F 21/561* (2013.01); *G06F 21/566* (2013.01); *G06F 21/57* (2013.01); *H04L 63/1408* (2013.01); *H04L 63/1441* (2013.01); *H04L 63/145* (2013.01); *H04W 12/128* (2021.01); *H04W 4/44* (2018.02)

(58) Field of Classification Search
CPC . H04L 63/0263; H04L 63/0227; H04L 63/02; H04L 63/029; H04L 63/0209
See application file for complete search history.

(56) References Cited

U.S. PATENT DOCUMENTS

| | | | | |
|---|---|---|---|---|
| 6,772,349 | B1* | 8/2004 | Martin | ................ H04L 63/1441 709/224 |
| 6,850,252 | B1* | 2/2005 | Hoffberg | .............. H04N 21/475 380/252 |
| 8,056,134 | B1* | 11/2011 | Ogilvie | ................. G06F 21/566 713/188 |
| 2006/0052962 | A1* | 3/2006 | Shipton | ................... G06F 21/71 702/106 |
| 2007/0033419 | A1* | 2/2007 | Kocher | ............ G11B 20/00086 713/193 |

(Continued)

*Primary Examiner* — Mahfuzur Rahman

(57) ABSTRACT

Software programs are updated and upgraded regularly. This is a cause for infection by malware (or a faulty program). By attaining the statistical relation between the input data to the program and the output data from the program the presence of malware may be detected with high fidelity. The base for this approach is the fact the necessary and sufficient conditions to determine the working of a program is evaluation of input against output.

2 Claims, 10 Drawing Sheets

(56) References Cited

U.S. PATENT DOCUMENTS

| | | | |
|---|---|---|---|
| 2007/0136811 A1* | 6/2007 | Gruzman | G06F 21/562 |
| | | | 726/24 |
| 2010/0031325 A1* | 2/2010 | Maigne | G06F 21/53 |
| | | | 718/1 |
| 2010/0281273 A1* | 11/2010 | Lee | G06F 21/72 |
| | | | 713/193 |
| 2010/0287038 A1* | 11/2010 | Copejans | G01S 19/14 |
| | | | 342/357.29 |
| 2012/0137364 A1* | 5/2012 | Blaisdell | G06F 21/577 |
| | | | 726/22 |
| 2013/0031042 A1* | 1/2013 | Dehnie | H04L 63/1416 |
| | | | 706/47 |
| 2013/0111211 A1* | 5/2013 | Winslow | H04L 9/3234 |
| | | | 713/150 |

\* cited by examiner

PROGRAM VERIFICATION AND MALWARE DETECTION

CROSS REFERENCE TO RELATED APPLICATIONS

This application is a continuation-in-part of U.S. patent application Ser. No. 15/675,611, filed on Aug. 11, 2017 and titled "Secured Automated or Semi-Automated Systems", which is a continuation-in-part of U.S. patent application Ser. No. 15/499,848, filed on Apr. 29, 2017 and titled "Access Management and Credential Protection", which is a continuation-in-part of U.S. patent application Ser. No. 14/606,992, filed on Jan. 27, 2015 and titled "Secure Computer Architectures, Systems, and Applications," which is a continuation-in-part of U.S. patent application Ser. No. 14/040,352, filed on Sep. 27, 2013 and titled "Secure Computer Architectures, Systems, and Applications," which claims the priority benefit of U.S. Provisional Application Ser. No. 61/744,677, filed on Oct. 2, 2012 and titled "Computer Architecture, System and Applications," and this application claims the benefit and priority of U.S. Provisional Patent Application Ser. No. 61/965,313 filed on Jan. 28, 2014 and titled "Add-on To Existing Computing Systems to Enhance Their Security", and this application claims the benefit and priority of patent application Ser. No. 15/675,611 filed Aug. 11, 2017 and titled "Secured Automated or Semi-Automated Systems", and this application claims Provisional Patent Application Ser. No. 62/818,374 filed on Mar. 14, 2019 and titled "Process Malware Detector", all of which are hereby incorporated by reference herein in their entireties, including all references cited therein.

FIELD OF THE TECHNOLOGY

Embodiments of the disclosure relate to computer security. More specifically, but not by way of limitation, the present technology provides secure computing architectures, systems, and applications. In some embodiments, the present technology employs both trusted and legacy hardware environments that protect programs and processes executed by computing systems and devices to support security, privacy, and safety. Specifically, the solution will identify malware infecting computer's programs.

SUMMARY OF THE DISCLOSURE

According to some embodiments, the present technology is directed to a system, comprising: (a) a legacy environment; (b) a trusted environment, that communicates with a network and the legacy environment; and (c) A program (process) that is executed by the legacy environment (computing system).

The invention allow for the protection—security, safety, and privacy—of a user of a malware infected legacy computing system programs from interference by malware.

According to specific embodiments, the present technology is directed to a system, comprising: (a) a legacy computing system executing a program that receive input data and process the input data to generate output data; and (b) a trusted environment device that receive both the legacy program input and output data, the trusted environment device being configured to communicate with a network directly; and (c) based on statistical relation between the legacy program input data and output data, determines the presence and risk of malware infection.

Worth noting that this could also indicate in general of a program mal operation The trusted environment (While a preferred embodiment from security perspective will be of hardware trusted environment—computing element—software could also serve as a trusted environment) or a network computing system, carry out the processing that detects potential infected program—indicating the possible presence of malware.

The statistical relation between input data and output data could be based on computation, simulation, or AI techniques.

The approach is different than program verification in the essence that it relies on statistical measures, while program verification relies on exact match between input and output data that are designed to indicate program proper processing.

The approach is diverging from classical AI techniques that analyzes "big data" and attempts to identify presence of malware by anomaly detection in the global input/output data set. The classical AI approach does not take advantage of the fact that necessary and sufficient condition for a program to be tested is the evaluation of the input data to it vs. the processed output data. Several advantages are to test each program individually:

1. Simplifies the process and reduces greatly the complexity. The process is linearly scalable with every program added with its process and there is no "relation" between programs.

2. The accuracy of the approach is higher—Probability of Detection to False Alarm Ratio is better since no "noise" is added by not related measures (of other processes).

A person skilled in the art will appreciate the fact that the necessary and sufficient conditions to determine the presence of malware (or fault) in a program is by evaluating its input against its output. The attempt to do it by means of other or additional data sources will impact and reduce the fidelity of the results.

BRIEF DESCRIPTION OF THE DRAWINGS

Following is a brief description of the figures used here after to explain the innovation The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that can be readily apparent to those of ordinary skill in the art having the benefit of the description herein.

DETAILED DESCRIPTION

Figure 1:
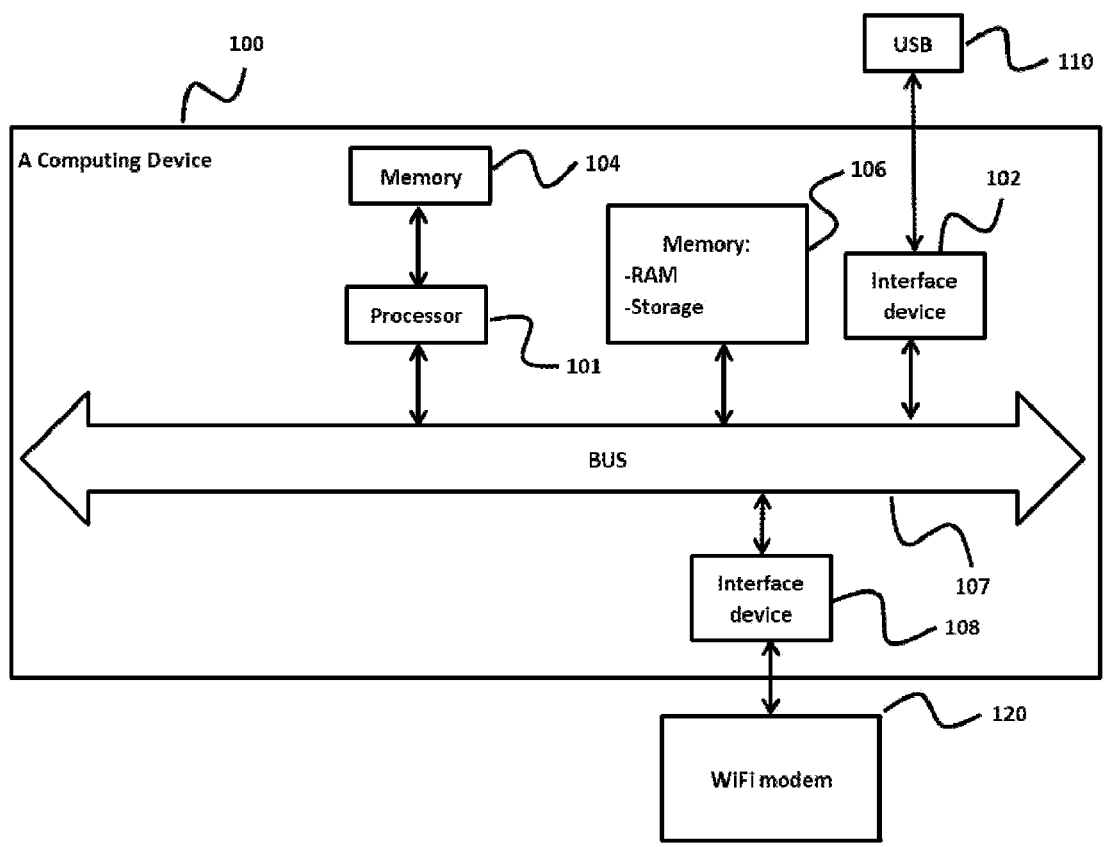
FIG. 1 Depicts a basic structure of a legacy computing system, a computing device, a specific design FIG. 2 Depicts more general and detailed description of a legacy computing system, demonstrating the potential varieties of legacy computing systems FIG. 3 Outlines the basis of the challenge—protecting software programs and processes FIG. 4 The process/program receives data from external entities, process it, and the processed data is delivered to an external entity.

In the following description, for purposes of explanation, numerous specific details are set forth in order to provide a thorough understanding of the disclosure. It can be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It can be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Advantageously, the present technology remedies the vulnerability of existing computing device, for example, legacy computers such as personal computers (PCs), notebooks, smartphones, and so forth. Vulnerabilities are caused by placing the processor and operating system (OS) of the computing device as the central computing component, which is exposed to each operation executed by the computing device.

Further, it is difficult, if not impossible to protect these legacy systems when a user encounters or downloads malware into the system. In non-limiting examples, malware may masquerade as a legitimate user by copying authentication information Of the user, Often without their knowledge. Also, the malware may transfer information to remote locations and expose sensitive information of the user to fraudsters. The above scenario is merely exemplary and many types of malware such as spoofing, phishing, Trojan horses, man-in-the-browser attacks, and other fraud-driven or malicious activities that would be known to one of ordinary skill in the art are also remedied by the present technology.

Indeed, these vulnerabilities may be overcome by abandoning a single CPU (processor and OS) computing architecture. The present technology contemplates computing architectures, systems, and devices that include a plurality of computing environments that are physically and/or logically separated from one another in such a way that the security, privacy, and safety of the users sensitive information is preserved.

As is used throughout this disclosure, the term *'sensitive information" may include any information that is input into, processed by, output from, or transmitted by a computing device that impacts the security, privacy, or safety of a user or device. Sensitive information may be understood to include personal information, personally identifiable information, intellectual property, or any other information that could be used in a malicious manner, which would be known to one of ordinary skill in the data privacy and data security arts. Exemplary and non-limiting examples of sensitive information can be described in greater detail infra, with reference to various exemplary use cases for the present technology. In some embodiments, the present technology may be embodied in a computing device that provides a trusted computing environment and one or more legacy computing environments. The trusted computing environment is generated by a trusted environment/component, which contains a hardware portion such as a central processing unit (CPU) and a software portion having an OS, application program interface (API)/drivers, and optional trusted applications, which will be described in greater detail herein.

Before discussing the details of the innovation with regard to processes and software programs carried out by legacy computing systems the legacy environment is presented in details to allow better understanding of the specifics of the innovation.

Computer systems are rich with various programs to process data. Each program (process) makes use of Input data and after processing it provides output data. The complexity of the programs and their sophistication requires updates and upgrades which introduces the risk of infection by malware.

Figure 2:
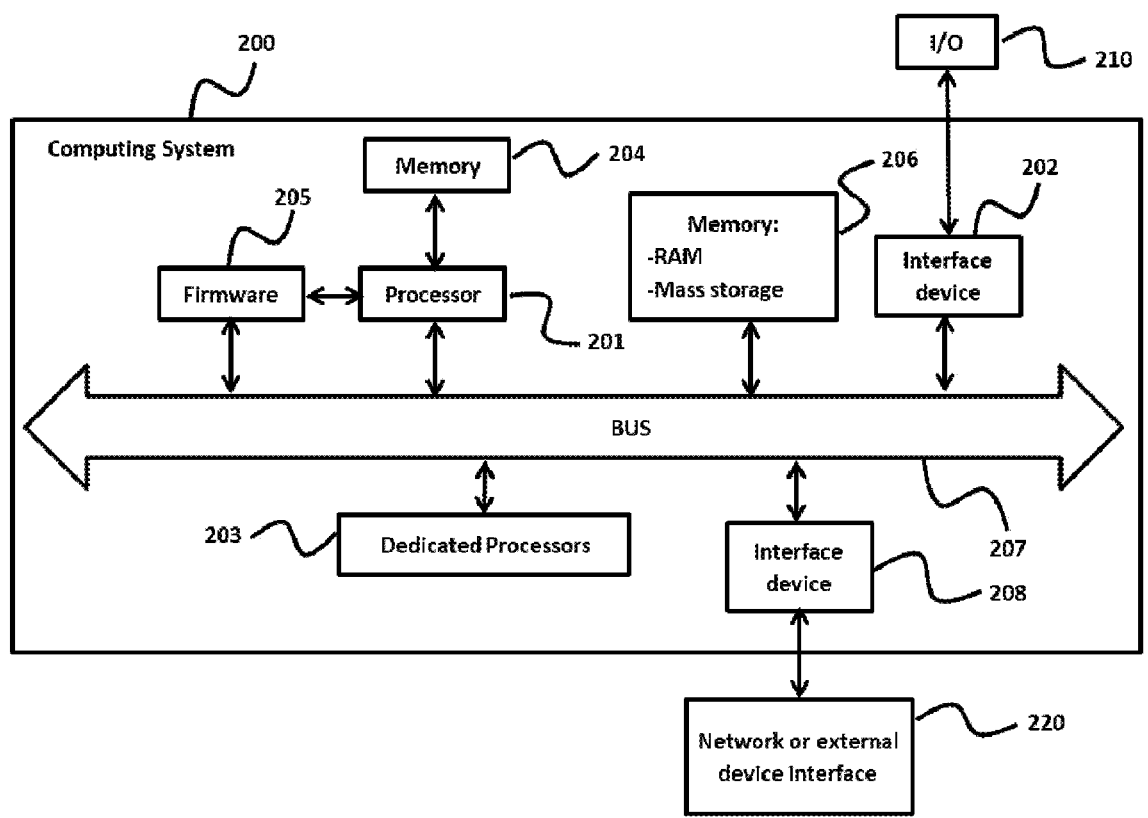

It is emphasized that the two general architectures presented and discussed in FIG. 1 and FIG. 2 are just exemplary to allow for a person skilled in the art to appreciate the breadth of the potential varieties and potential designs for legacy and trusted computing systems and elements.

FIG. 1 depicts a basic legacy computing system/device 100. Variants of this architecture are used in actual implementations. All architecture use of a single bus to allow communication between the various components of the system—this is the Von Neumann machine.

A program that resides in memory 106 is executed by the processor 101. The programs may be updated and upgraded from time to time by modifying the memory content. The modification could be made by the user of the computing system or automatically. These updates and upgrades are the cause for infection by malware—the focus of this innovation is on defeating attempts by the malware to access user sensitive information or acting by masquerading as the user or a user.

In the following, the terms program and process are used interchangeably. Sometime computing system/device is used to refer to the "process" as hardware element.

The computing device 100 in FIG. 1 is comprised from the following elements in this specific embodiments:

A processor 101 which is connected to local memory 104 serving as means for storing temporary data required for executing of the program residing in memory 106.

Interface device 102 is configured to support USB 110 devices such as but not limited to keyboards, cameras, mouse System memory 106 is utilized for storing programs and data for short periods, participating in a program execution, and long term periods, storing programs to be executed and data storage. Data and programs may be encrypted while stored and decrypted before use.

The computing device components, as described above, are cooperating on a shared BUS 107

The computing device has also means, interface device 108, that allow interfacing external elements on the network by a WiFi modem 120.

A unique feature to programmable computing devices is the ability to modify the programs and processes that are stored in the device memory 106. This feature is the source of potential altering a well operating and behaving device into a defected device, infected by malware and operated.

To avoid potential infection of a computing device various actions may be taken, any of or combination thereof, but not limited to, of which the focus of this innovation is with regard to implementation of a secured (trusted) system (device or environment), utilizing fixed functionality computing devices to implement trusted environments (also may be termed—systems, devices):

1. Replacing the general purpose programmable unit 101 with fixed program if embedded hardware or by means of unmodified firmware.

2. Using Read Only Memory (ROM) as the portion of the memory 106 that stores the programs 3. Allow only a single entity (such as but not limited to, an internet site) supported by stringent authentication process (multi factor) to make modification to the programs over the network or remote peer by the WiFi modem 120 or via the USB 110 interface.

FIG. 2 depicts the computing system 200 architecture with extensions, emphasizing the potential variety of implementation of computing systems, most notably, the dedicated processors 203 such as but not limited to the security component TPM. Most legacy systems utilize processor 201 with multiple cores.

It should be emphasized that a person skilled in the art will find variation to fit and meet specific requirements for applying computing systems for various needs.

The processor 201 executes program that reside in the memory 206 by means of auxiliary memory 204 and the operation may be enhanced by a firmware 205 with fixed or programmable functionality.

Dedicated processors 203 may be used to serve specific functions—such as and not limited to—security: encryption and decryption, deep machine learning: neural network accelerator, vector processor, etc.

Interface device 202 allow communication with users by means of I/O 210 (Input and Output) which support the use of such devices but not limited to—Input devices: keyboards, touchscreen, pad, mouse, camera, microphone, biometric, GPS, etc. or output devices: display, speaker, security warning, etc.

The network or external device interface 220 supports communication with network entities sites and other devices peer to peer communication.

Data is fed (Input Data) to the computing system 200 by means of the Input (I in the I/O 210) or over the network (such as but not limited to WiFi) or external device interface 220 from such elements as internet sites or sensors. The data is processed in the computing device and is delivered by means of Output (O in the I/O 210) or over the network (such as but not limited to WiFi) or external device interface 220 to such element as internet site or actuator.

Figure 3:
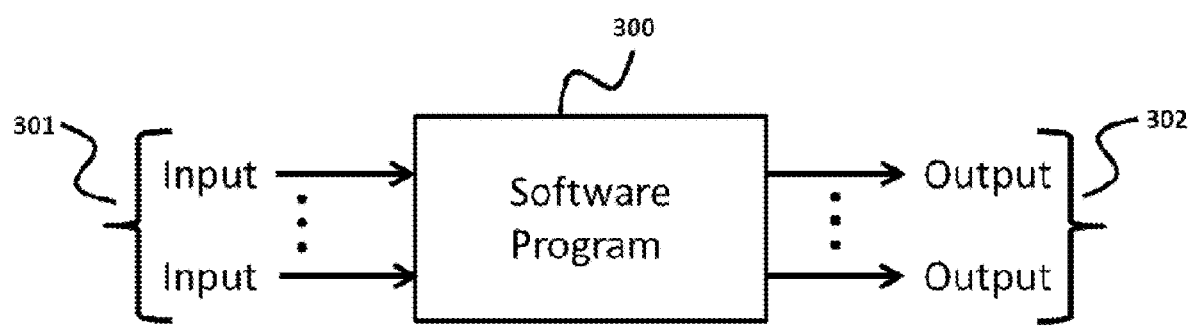

FIG. 3 depicts a basic software program 300 execution. This represents any software component with defined input and output. Based on specific designs and a person skilled in the art the software running on the processor 201 may be constructed from multiple programs 300, each well defined by input(s) 301 and output(s) 302. The program 300 might be in certain states which result different output(s) 301 from the same processed input(s) 302.

The purpose of this innovation is to provide methods to determine if a process carries out the desired process, meaning, results an outputs that fits the inputs.

The basic claim is that statistical relations exist between the inputs 301 and the processed inputs 301 resulting outputs 302. These relations may be quantified in various ways that are well known from the field of anomaly detection but may be refined with tools from other fields.

The outputs 302 data is a function of the inputs 301 data which means that there is a statistical relation between the outputs 302 and the inputs 301 data. In other words—certain patterns of "inputs" 301 result expected patterns of "outputs" 302 which in most cases are not deterministic and could be represented by probability distribution functions and for a given inputs 301 pattern (values) and outputs 302 pattern (values) determine a probability of such event to occur—probability of detection, and probability of error (false alarm rate).

A person skilled in the art will determine specific decision process may to avoid damage by infected process, creating proper threshold based of the system and the potential damage unwarranted operation. Reaction time and "resampling" will farther balance between probability of detection and false alarm rate to optimize operation At least three means are available to determine those patterns. In some cases only the last one—anomaly detection—is practical. Also combination of means is possible to allow for reducing the training and updates/upgrades periods—during which the system is not operational:

Computational—which may be regarded best practice since it provides most accurate statistical measures for deciding about a measure of discrepancy between the Input and Expected Output Simulated—having enough knowledge of the various set of inputs 301 the process is carried out and the resulting set of outputs 302 is matched to the input 301. With techniques, such as machine learning and big data analysis (or may be even AI—artificial intelligence—techniques) the statistical relation between input sets 301 and output sets 302 is determined.

A third option is to use actual fielded systems to determine the statistical relation between input sets 301 and output sets 302—during training sessions of fielded systems or recordings during normal operation As stated, a combination of the above options may be used to determine the statistical relation between input sets 301 and output sets 302 where for some inputs 301 or outputs 302 computational means are used to determine statistical behavior, for others simulation and for others training or normal operation analysis.

It is also beneficial to refine or verify computational or simulation by continuous monitoring of actual behavior of the networked system to identify changes in components in the system that are "normal" and result changes in input patterns 301 and require adoption of output patterns 302 to allow proper probability of detection or reduction in false alarm rates.

The computational determination is the preferred one allowing the best means for designing for desired probability of detection and false alarm rate.

Simulation is the second best options that allows for determining the operation of the process by selecting representative patterns (301 and 302) and with time refine the correlation between input 301 and output 302.

The third option of machine learning and AI techniques could be used to train a solution to the probabilistic relation of output 302 to input 301, it could be before final "fielding" and during normal operation. Changes in the system may require refinement of the operation by retraining.

The end result is defining Normal expected output patterns 302 (values) for a given set of input patterns 301 (values) based on the expected distribution of input 301 values and determine the probability that a software process is contaminated if discrepancy and deviation of the output set 302 from the expected values based on the input sets 301.

Though the collection of information is based on common sampling time and periods, the evaluation could be across time and inputs—couple of examples:

Information of location or position could be used to calculate (a process example) velocity vector (value and direction). Corrupted process by inserting erroneous location or position or directly altering the velocity vector could lead to catastrophic damage—collision, crash The velocity information can be used to calculate acceleration vector (change in velocity) and force vector (based on mass or pressure sensors—value and direction). Altering information here could lead to irrecoverable damage.

For a heated chamber (gas turbine), pressure, temperature and volume are related to mass and flow. Changes with time could allow the detection of corrupted software carefully crafted to cause a calculated damage while avoiding directly pointing to the source of corruption.

The infected process may carry out a DDoS (Distributed Denial of Service) attacks on the network to disable the network operation by loading the communication between the network elements and disrupt the operation up to make it total useless.

Figure 4:
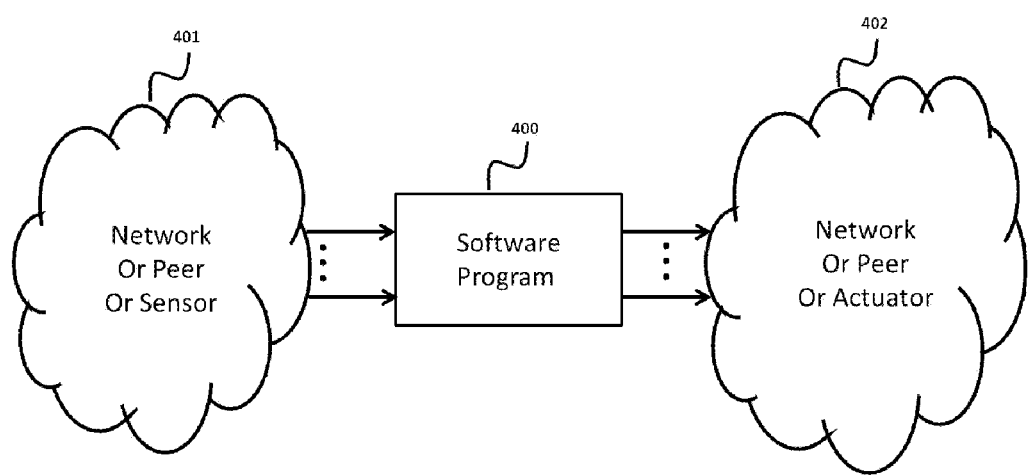
Figure 5:
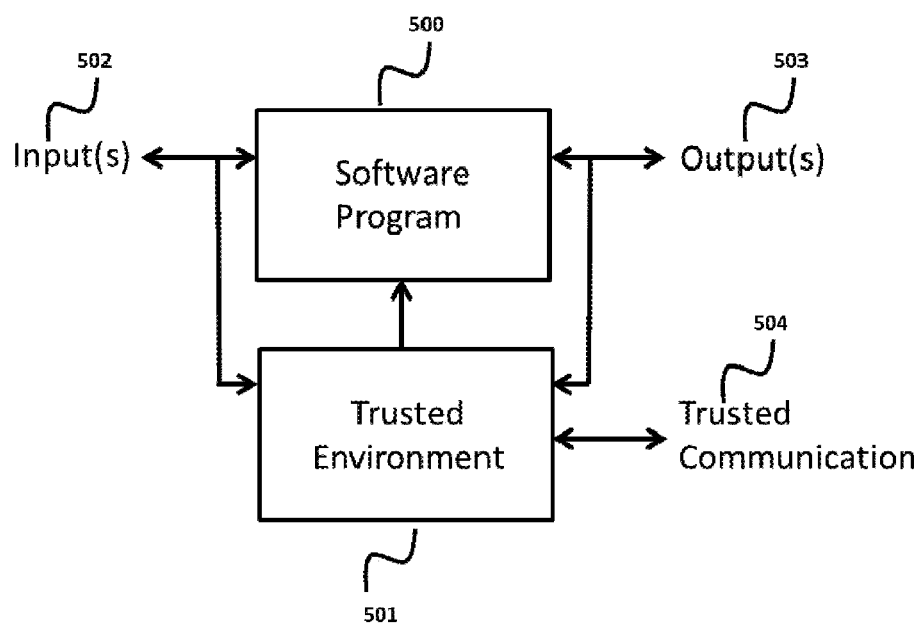
FIG. 5 Integration of a software program with a trusted environment

To support the above functions to defeat possible contamination of software programs and/or processes the innovation suggest adding means that will operate in parallel to the processes—preferable by hardware means FIG. 4 depicts The software program 400 (also 300) connected to network or peer or sensors to receive input data. The software program 400 is connected to network or peer or actuators 402 to provide them with output data. The software program 400 operates on the input data to produce the output data FIG. 5 Depicts the basic architecture of the innovation—securing a software program 400. A trusted environment 501 is added to operate parallel to software program 500 to be secured. The trusted environment 501 monitors the software program 500 while receiving samples of the input 502 that is processed by the software program 500 to produce the output 503 data of which samples are also provide to the trusted environment 501.

By evaluating the input 502 data against the output 503 processed data by the trusted environment 501 or another entity to which the trusted environment 501 transmits the input 502 data sample and the output 503 data sample, the integrity of the software program 500 is graded.

Based on the variance of the values of the two, input 502 and output 503, the probability of an alteration of the software program 500 is determined and potential infection by malware (or a program malfunction) is deduced.

The preferred trusted environment 501 is a hardware computing device that is connected physically parallel to the computing device that runs the software program 500. It may be implemented in software—no such detailed approach has been suggested thus the innovation may be expanded to software implementations though not preferred embodiment.

Detailed discussion of the evaluation base is presented in paragraph [0054] to [0058].

Since the evaluation is based on a priori knowledge developed based on the specific nature of the input 502 and output 503 and possible relation between the two some creative approaches may be employed—for example input 502 and output 503 values may be limited in range and as result simplifying the evaluation process, speed it up or reducing the required processing power.

Figure 6:
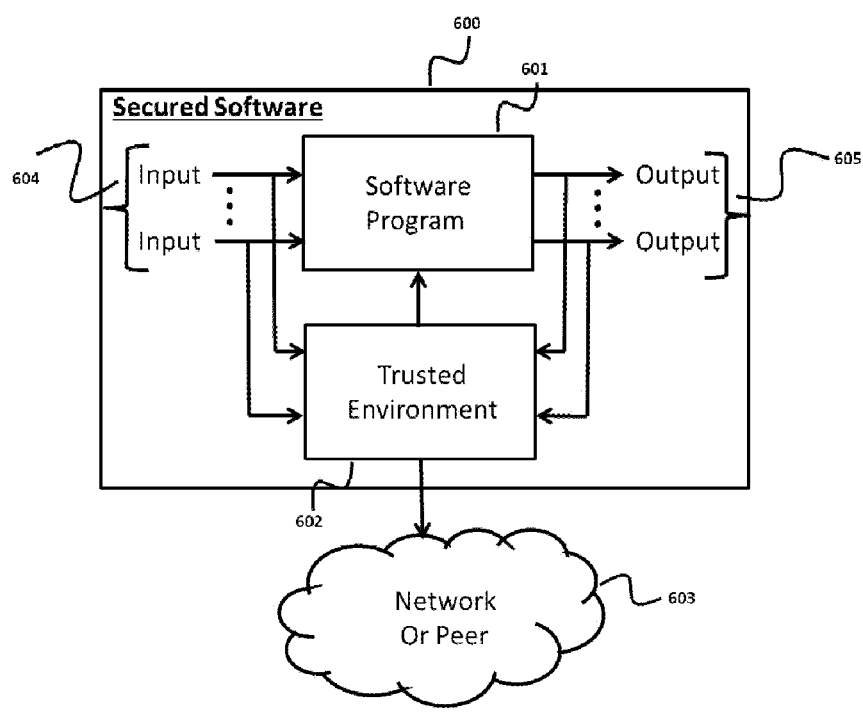
FIG. 6 Integration of a secured software program to the network or peer

FIG. 6 depicts the process, the secured software 600 program. The secured software 600 receives input 604 over the network or directly from other systems (peers) 603 or communicates with sensors and actuators over the network 603 or directly to the input 604.

The secured software 600 program is comprised of two elements, a software program 601 and the trusted environment 602. The software program 601 operates on the input 604 and generates the output 605 that may be sent over the network or to a peer 603.

Infection by malware of the process, software program 601 could result altering of information or attacks on the network (DDoS, phishing . . . ). The need is to detect and defeat such hacks of the software program 601 effectively.

To defeat malware that infects a process, the software program 601, a trusted environment 602, preferably a hardware computing element, operating parallel to the legacy computing element that runs the software program 601.

The trusted environment 602, a software program or preferably a hardware computing system/device operating "in parallel" to the legacy computing system/device (represented by the software program 601)

The trusted environment 602 as a hardware computing device will serve as a Malware Detector or communicate with a network entity that will the function of Malware Detector based on information communicated by the hardware trusted environment602 to the remote Malware Detector.

Some possible functions and features of the trusted environment 602—
1. Gathers input 604 data, raw data, communicated to the software program 601 and output 605 data, the processed data which is the result of the software program 601 operation on the input 604 data.
2. Communication with network nodes and peers as designed
3. Encrypt and decrypt data
4. Block the process, the software program 601, from accessing the network or other peers 603
5. Evaluate input 604 data against output 605 data (processed data) based on statistical/probabilistic information obtained by means as described in paragraph [0054] to [0058] above or communicating the input 604 and output 605 information to a Malware Detector node of the network.
6. Controlling the software program 601—clearing it from the legacy computing device memory and allow for the safe uploading of a clean program transferred from the network or pre stored in the trusted environment 602
7. Support safe updates and upgrades to the software program 601 (Process)
8. Allow for feeding test input 604 data to the software program 601 and evaluate it against the output 605 data or communicate with a network node that will implement the test.

The secured software 600, combining a software program 601 with a trusted environment 602—the software program 601 resides in a legacy computing system/device that is protected by the trusted environment 602—another computing system/device (or a software program—a non-preferred and less secure implementation).

The software program 601 may be updated or upgraded from the network 603 but is fully controlled by the trusted environment 602.

Key features of the trusted environment potential functions:
1. Fixed functions
2. Control of the legacy computing system/device
3. Direct access to the Input Data
4. Direct access to the Output Data
5. Encryption and Decryption
6. Direct interface to other network elements and particularly trusted environments
7. Monitoring the quality of the Output against Input
8. Determine the probabilistic relation between the Input Data and Output Data by collecting information while in operation.
9. Detection of variations and anomalies between Data Input and Data Output
10. Blocking and containing the software program (process, legacy computing system/device)
11. Implementing backup operation
12. Support such functions with the aid of other network nodes or peers
13. Testing the process integrity by feeding the software program (process) with predetermined Input Data and compared to the resulting Output Data FIG. 7. Describes several exemplary configurations that may be used subject to specific design goals and implementation. It depends on the nature of the system and if, for example, a fielded system is upgraded to secure its software elements, in which case the integration of a Trusted Environment with an existing Software Program is limited.

Structure 1 700 show operation of a software program 710 operating oblivious to the trusted environment 720. The trusted environment 720 is used to monitor the software program by observing both inputs and outputs to the software program 710. Both, the software program 710 and the trusted environment 720 communicate with network node or peers. This structure allow for the detection of malware infecting the software program 710 by the trusted environment 720 or by a network node or peer to which the software program 710 input and output data are sent by the trusted environment 720

In Structure 3 701 the trusted environment 721 controls the input to the software program 711 but both are able to communicated with the network nodes or peer to peer. This structure support such functions as:
1. Detection of malware infecting the software program 711 as described for structure 1
2. Safe software program 711 update and upgrades
3. Testing of the software program 711

In structure 2 702 The trusted environment 722 controls the output of the software program 712, supporting the functionality:
1. Detection of malware infecting the software program 711 as described for structure 1
2. Blocking the software program 712 from accessing the network or peers—defeating DDoS (Distributed Denial of Service) attacks
3. Provide encryption and decryption functions In structure 4 703 the full advantage of adding a trusted environment 723 to fully control the operation of the software program 713 allowing functionality as described for all structures 1 700, structure 2 701, and structure 3 702.

By maintaining a fixed functionality (program) of the trusted environment in all four (and others that may be realized) structures the potential infection from network nodes or by peer to which the trusted environment communicates, is virtually eliminated.

Figure 7:
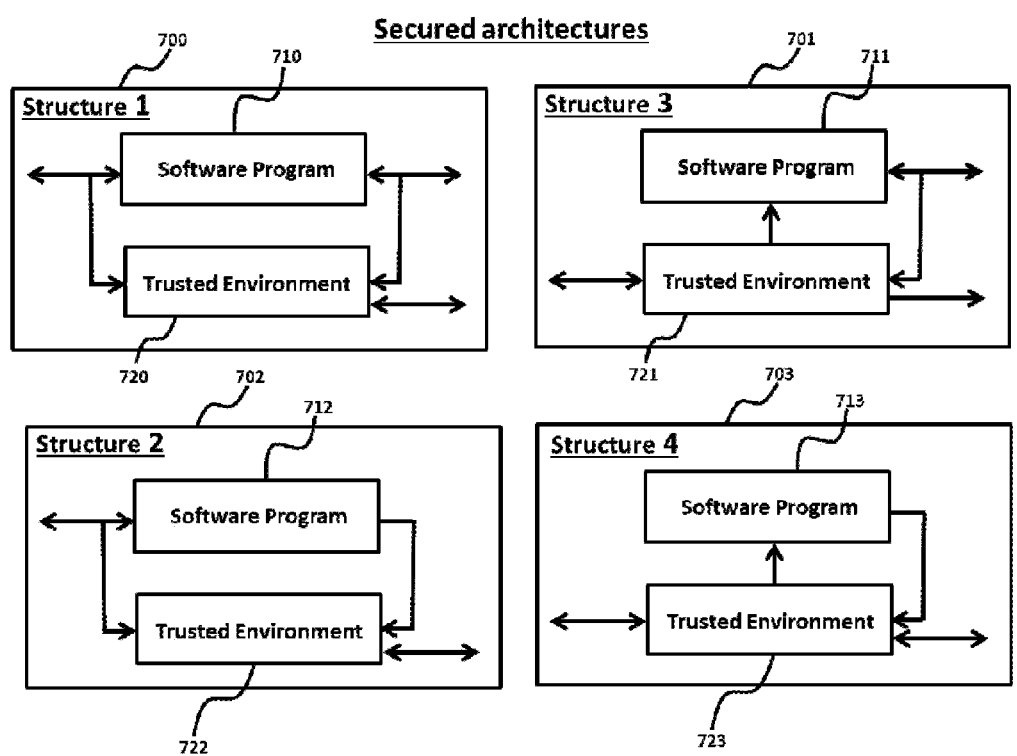
FIG. 7 Four examples of architectures implementing the innovation

The functionality of the trusted environment is not limited to the functions as outlined for the various structures in FIG. 7. Additional potential functions could be, but not limited to—subject to specific design requirements and approach employed by a person skilled in the art:
1. Storing and Communicating a device ID
2. Time recording of events
3. Secured authentication
4. Hashing capability to support security of shared information by multitude of trusted environments or other computing elements
5. Storing of data and evaluation parameters to support malware detection
6. Storing test vectors and expected outputs.

There is room for a variety of implementations of the gist as outlined in the previous paragraphs. For further clarification FIG. 8 will depict a general network design with details of components and how the evaluation of input against output may be done, to point how design consideration of a person skilled in the art might be reflected in selection of establishing the statistical relation between input and output.

Figure 8:
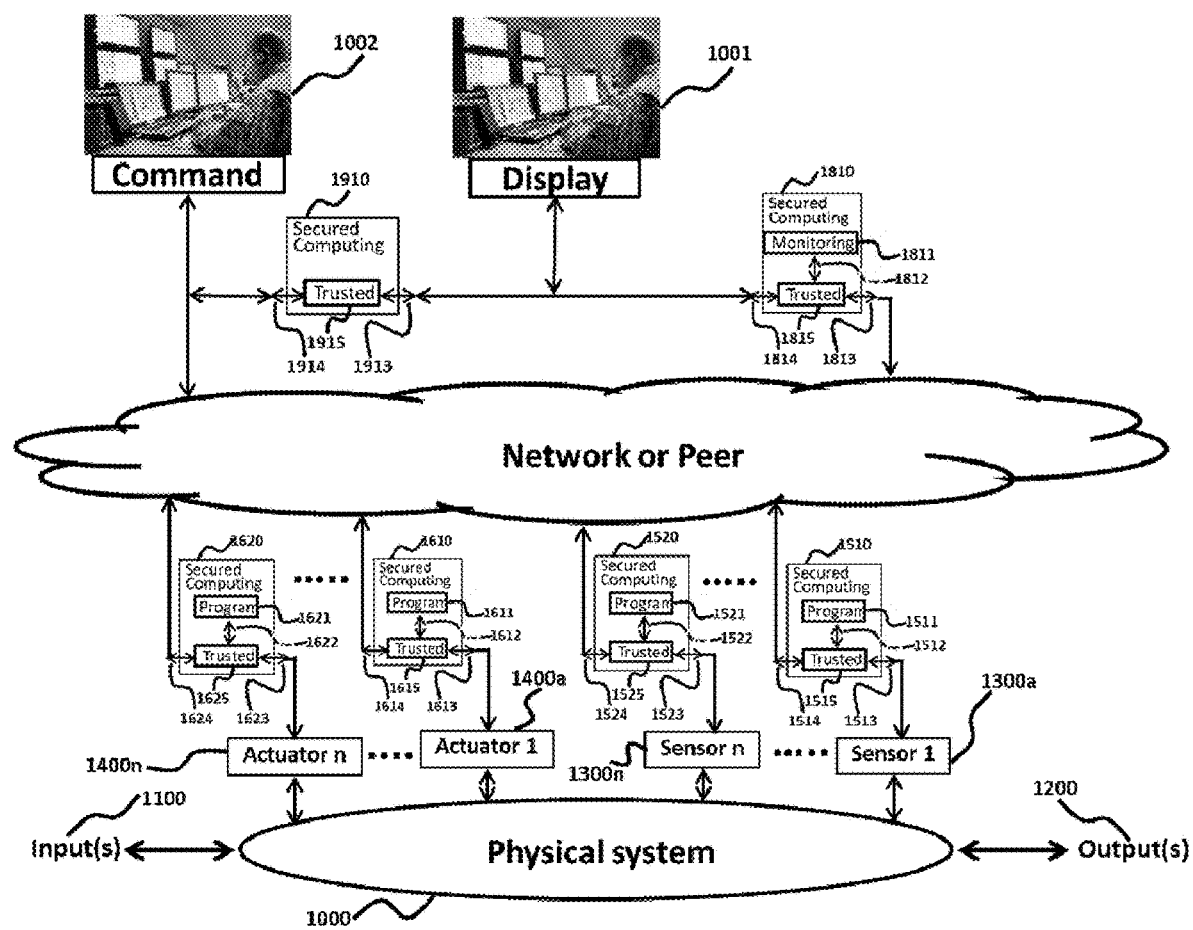
FIG. 8 Example of an ICS (Industrial Control System) benefiting from secured programs running on the various network nodes.

FIG. 8 depicts a network which is designed to operate what is termed Cyber Physical System 1000 (CPS) where the innovation is implemented in different modes that further details of its use and implementation by a person skilled in the art.

This is an exemplary block diagram depicting key components of a preferred embodiment. A person skilled in the art would know how to take advantage of the description to upgrade fielded systems or create a full new design.

A physical system 1000 is, such as: gas turbine, water treatment, wind or water turbine, car, drone, IoT network . . . .

The physical system 1000 is monitored by means of any number of sensors 1300*a* to 1300*n* and any number of actuators 1400*a* to the $n^{th}$ 1400*n*. The number of actuator does not need to be equal to the number of sensors.

The sensors 1300*a* to the $n^{th}$ 1300*n* provide raw measurements information of the state of the physical system 1000.

Such measures may be: Temperature, pressure, flow, vibration, distance, speed, acceleration, height, location, rotation, direction, magnetic field, electrical field, intensity, current, voltage, frequency and any other value, where the value indicate a state of the physical system 1000.

The measured value may appear as analog or digital value.

If the measurement is analog, the trusted component (such as 1515 in secured computing 1510) will convert it into an analog value.

The actuators 1400*a* to 1400*n* allow for modifying the state of the physical system 1000 to desired states if the sensors 1300*a* to 1300*n* are indicating that the state of the physical system 1000 is diverging for the preferred envelop of operation.

The measurements of the sensors 1300*a* to the $n^{th}$ 1300*n* may be processed to remove noise and create stable and accurate measures to allow further operations to determine accurate value to the state of the physical system 1000.

The processing of the raw measurements such as 1513 to the $n^{th}$ 1523 of the sensors 1300*a* to the $n^{th}$ 1300*n* are carried out by such means as secured computing elements 1510 to the $n^{th}$ 1520. Though not detailed, it should be clear that each of the n sensors raw measure is processed by a secured computing device.

The purpose of the secured computing 1510 to the $n^{th}$ 1520 is to validate that the programs 1511 to the $n^{th}$ 1521 are not infected by malware.

For the purpose of simplifying the discussion without losing generality the description will focus on the 1510 secured computing component but it may be easily expanded to the $n^{th}$ 1520 secured computing component by any person skilled in the art.

Emphasizing again that the diagram suggest multitude of sensors (n) and multitude of actuators (n). The number of sensors does not have to be equal to the number of actuators.

As detailed before, the suggested operation of processing a sensor is exemplified by the secured computing 1520, and each sensor might have such processing.

The system may include sensors and actuators that does not have secured processing elements for them. Such sensors and actuators are not included in the system description. The system may include additional elements not described in diagram 8 since those could be legacy elements and there is no point in adding elements that are not discussed here. Any person skilled in the art will be able to depict the appropriate total system diagram and identify elements of various nature and technical implementation.

The description of an exemplary secured computing 1510 for the sensor follows:

Raw measurement 1513 from sensor 1 1300*a*, typical analog value, is fed to the trusted 1515 element in the secured computing 1510.

If analog, the trusted 1515 element will carry conversion of the measurement 1513 to digital by means of A/D and the digital form, by means of 1512 connection, will be fed to the program 1511 element.

The program 1511, running of a dedicated computing element which is physically separated from the trusted 1515 element and could be referred to as the legacy part of the system, carries the process to condition the measurement for further operation. The resulted processed measurement will be fed back to the trusted 1515 element.

The trusted 1515 may carry out evaluation of the processed measurement with reference to the raw measurement.

As discussed before, the basis for this evaluation may be based on calculated statistical relation, simulated statistical behavior, or machine learning (could be enforced)—anomaly detection based statistical behavior.

The trusted 1515 may carry function of encryption and decryption

The trusted 1515 may control the program 1511—blocking access to network, refresh the program, modify parameters . . . .

The trusted 1515 may support device authentication means—Identification, session number, time.

Trusted 1515 may include means to authenticate the communicating node or peer.

The trusted 1515 element, communicating with the network via 1514, could transfer or receive, a plurality of information to network nodes such as secured computing 1810 that serves the monitoring station and display 1001—raw sensor measurements, processed sensor measurements, device identification, encryption codes, fresh process program . . . .

Similarly actuators 1400*a* to the $n^{th}$ 1400*n* may be acting on values received from secured computing 1610 to the $n^{th}$ 1620. Though not presented—up to n, not the same number as the sensors, actuators may be each controlled by a secured computing system. It is also clear that the number of actuators "n" is not identical to the number "n" of sensors.

For the actuators the discussion will focus only on one secured computing 1610, but without losing generality it is applied to any secured computing system, such as 1620, controlling an actuator. To secure an actuator a properly programmed secured computing element 1610 to the $n^{th}$ 1620 is added, receiving the actuation commands and resulting the action value for the actuator as digital or analog (by means of D/A incorporated in the trusted)

As with the discussion of the sensors elements, the discussion for the actuator will detail with reference to actuator 1, but it is generally applicable to any actuator attached or controlled by secured computing elements, 1610 to the $n^{th}$ 1620. Any person skilled in the art is capable to grasp the generality of the design and apply it to any actuator.

The key purpose of the actuator secured computing 1610 component is to validate that the command sent to the actuator 1400*a* is carried out as desired and not contaminated by malware infecting the program 1611.

The command is received via the network from the secured computing 1910 by means of the communication 1614. This communication is bidirectional and may be encrypted. It allows for identification of the secured computing 1610 and could communicate to the network nodes, such as the command 1002 system the allow operator or program to generate the actuator command that by means of program 1621 produces the action value (digital or analog).

Details of the secured computing 1610 operation:

Communication 1614 supports the secured computing 1610 connection with the network or peer.

The trusted 1615 controls the communication 1614 to the network or peer and connection 1613 to the actuator.

As mentioned above, the connection 1613 may carry a digital or analog signal which will be referred to as the action.

The Trusted 1615 May have Various Functions:

Receive the ACTION COMMAND from the command 1002 station or another secure computing such as secured computing 1510 by means of the communication1614

Transfer the ACTION COMMAND to the program 1611 by means of connection 1612

Receive the ACTION from the program 1611 by means of connection 1612

Transfer of ACTION to actuator 1 1400a by means of the connection 1613

The trusted 1615 may communicate the ACTION to another node of the network or peer by means of 1614 where the ACTION COMMAND is evaluated with reference to the ACTION for the purpose of determining if the program 1611 is contaminated with malware and altering the ACTION output to cause damage.

The above function may be implemented by the trusted 1615

As explained above, statistical relation of the values of the ACTION COMMAND and ACTION may be derived in various ways, as examples—computational based on the program 1611 functions, or simulation based on running many synthetic ACTION COMMANDS and evaluate the statistical relation to the ACTION generated by program 1611, or machine learning of ACTION COMMAND relation to ACTION as measured for fielded physical system 1000—detection of deviation from expected statistical behavior (in some cases such deviation is termed as anomaly) indicates contamination by malware (or program 1611 error) and need for action to protect the physical system 1000 from damage.

The trusted 1615 controls the communication of the program 1611 and may be used to contain and block attempts of DDoS (Distributed Denial of Service) attacks by the contaminated program 1611.

Trusted 1615 may generate an ACTION based on the ACTION COMMAND to avoid damage tough the operation of physical system 1000 will not be optimal or report the deviation to another node on the network or peer, and receive an ACTION value to be transferred directly to the actuator1 1400a

Trusted 1615 may be designed to clear the program 1611 of the legacy component of the secured computing 1610 and load a refreshed program 1611 that will return to normal operation. The program may be stored in the trusted 1615 or received from another node on the network or peer.

Additional functions may be implemented in the trusted 1615 to further increase the security:

Authentication procedures based on trusted 1615 Identification Number, time, session number, location, IP address and others Authenticating the communicating network node or peer Trusted 1615 may include encryption and decryption functions to secure storage and communication of data, programs, measurements, commands Actuator 1 1400a to the $n^{th}$, actuator n 1400n are used to modify the state of the physical system as measured by the sensors, sensor 1 1300a to the $n^{th}$ sensor n 1400n—where the number of sensors does not need to be equal to the number actuators though the same letter "n" is used.

Actuators are utilized to modify the state by interpreting the ACTION generated based on ACTION COMMAND and sensors measures to a physical operation.

Operations will change the state of components of the physical system, such as—valve, brake, motor, switch, generator, mixer and any other type of component that may be utilized to modify the state of the physical system 1000.

Using the classical terms—the secured computing elements 1510 to the $n^{th}$ 1520 and 1610 to $n^{th}$ 1620 are functions implemented in the PLC (Programmable Logic Controllers) of a legacy ICS/SCADA network to enhance its security.

The monitoring and operation of the ICS/SCADA system (as an example of a system that includes a physical system, sensors, and actuators) is maintained by operators with the means of Display 1001 and Command 1002 systems.

The discussion to this point focused on the sensors and actuators design

This discussion covers only the components of the network (As example ICS/SCADA) that pose risks of contamination by malware and altering sensor measurements at the source, altering actuator commands and the target, and attacks on the network (or peer) by DDoS attacks (or even SPAM).

Here after the discussion will be of other computing elements that are prone to infection by malware—
1. Data fusion programs
2. Command generation programs
3. Routers and NDS (Network Defined Software)
4. Anomaly detection programs with monitoring elements
5. Monitoring and display systems for operators, including operational and maintenance
6. Actuators command generation system based on sensors measurements and operator input All those may be exemplified by the secured computing 1810 and 1910.

Both computing systems 1810 and 1910 have programs that could be monitored the same way as detailed before, computing system 1810, or by means of trusted environments that monitors user input, computing systems 1910.

In summary, FIG. 8 depicts a multitude of various computing systems that may be found in any network, internet included. By no means this is not an exhaustive list any person of ordinary skilled in the art could identify computing systems in specific network that could take advantage of the addition of means to detect malware (or malfunction) in programs executed by the computing systems as was suggested in this specifications.

It should be clarified that every means employed should be implemented taking into account the nature of the input and output to programs and determine how to derive and compute the statistical behavior of input and output and their relation—will it be a computation based on accurate knowledge of the distributions, or simulations to determine the statistical relation (could be by means of importance sampling), or machine learning techniques which are well studied by now and could be used by training means or with fielded systems.

It should be emphasized as conclusion—though the preferred embodiment from the secured perspective is hardware means that monitor the programs prone for infection, the implementation does not exclude use of software solution—the key innovation is in the realization that necessary and sufficient condition to detect malware (or mal operation) of a program is by monitoring the program.

Typical implementations by current systems employ heavy anomaly detection software that waste resources with regard to the malware detection and defeating it—it is useful for other purposes but employing it for the malware detection purpose reduces the effectiveness by adding noise to the process, thus not only wasting resources, resulting inferior PD/FAR ratio (Probability of Detection vs. False Alarm Rates).

Figure 9:
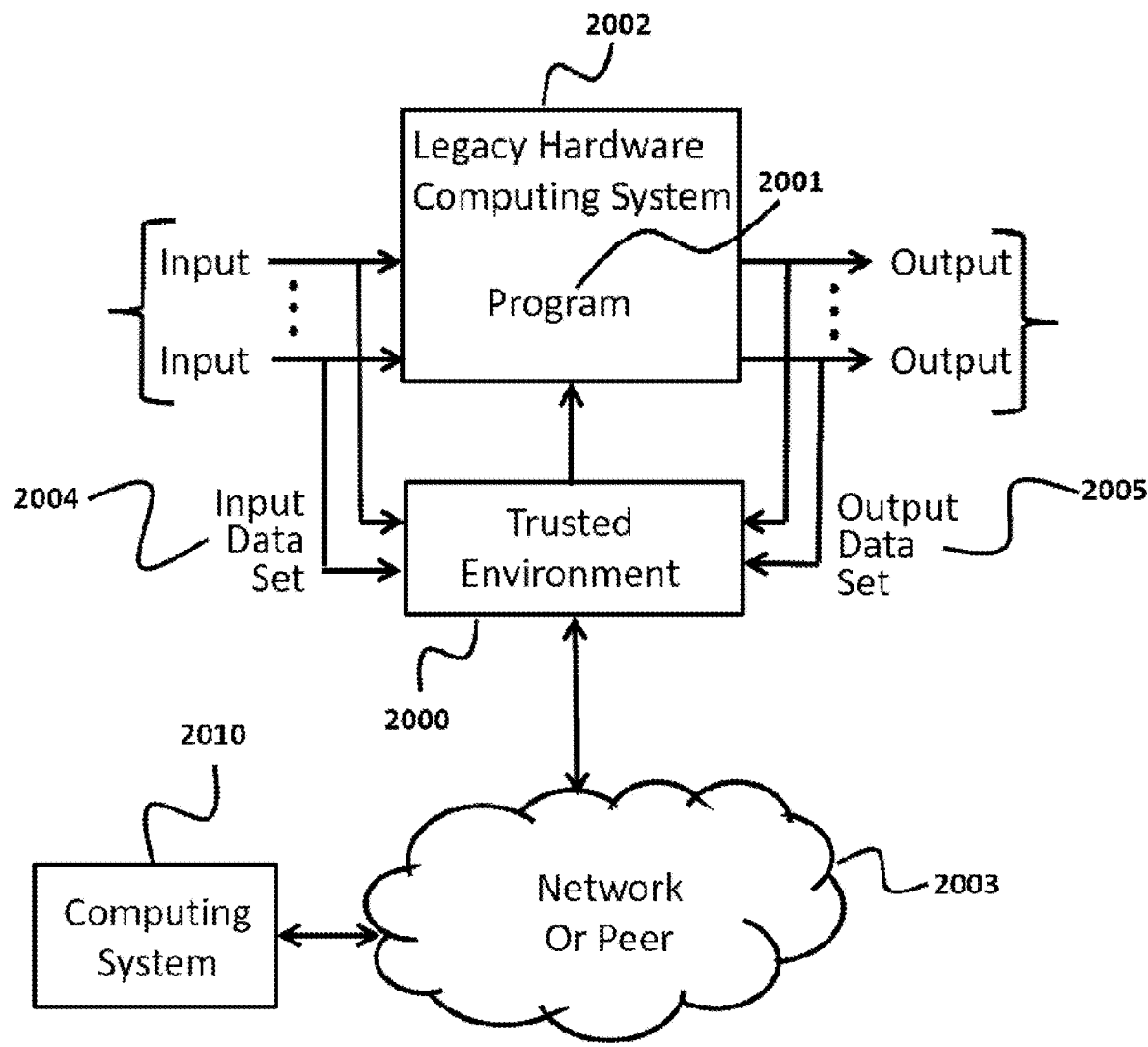
FIG. 9 claim 1 details described

FIG. 9 Depicts what is claimed:

A trusted environment 2000:

Receiving two data sets: an input data set 2004 of a program 2001 executed by a legacy hardware computing system 2002 and an output data set 2005 from the program 2001.

The trusted environment 2000 process the two data sets (2004 and 2005)

Or

Communicating the two data sets (2004 and 2005) to a computing system 2010.

The process carried out by the trusted environment 2000 of the two data sets (2004 and 2005) may be any of—
1. Evaluating discrepancies of the statistical characteristics of the two data sets (2004 and 2005) gained by means as described in details before—computation, simulation or machine learning.
2. Machine learning algorithms, AI algorithms or any other preprocessing of the data sets (2004 and 2005) to be further processed by the computing system 2010.
3. Other functions not related to the data sets—monitoring the legacy hardware computing system 2002, refreshing the program 2001, blocking communications of the program 2001 or the legacy system 2002, support backup operation of the target system, support testing of the program 2001 or the legacy system 2002.

The trusted environment 2000 may be designed only as software program sharing the same hardware environment as the program 2001, running in parallel to the program 2001, receiving the input data set 2004 and output data set 2005.

The preferred (secured) implementation will have the trusted environment 2000 on a separate hardware computing system on which its software will be executed without hardware sharing with the program 2001.

The trusted environment 2000 may be implemented as a software program executed on the legacy hardware computing system 2002 as the program 2001

Or

The trusted environment 2000 may be implemented on a separate computing device serving as the trusted environment 2000.

The two data sets, 2004 and 2005, evaluated to determine failure of the program 2001 due to malware infecting the program 2001 or faulty program 2001.

Evaluation of the two data sets, 2004 lnd 2005, may be carried out by the trusted environment 2000 or the computing system 2010.

The computing system 2010 may communicate with the trusted environment 2000 over the network 2003 or directly (as peer)

The input data set 2004 and output data set 2005 are related by the means of the program 2001 that receives the input data set 2004 and generates the output data set 2005.

The related statistical relation between the two datasets 2004 lnd 2005 may be a simple computation, such as raw sensor measurements processed (input data set 2004) by a program 2001 to result processed sensor measurement (output data set 2005).

For a person skilled in the art it will be obvious that included are cases where the program result a pairing between input data set 2004 and output data set 2005—thus determining that the program 2001 failure is straight forward.

In other cases the statistical relation could be complex and complicated, a multi-dimensional input data set 2004 resulting a multi-dimensional output data set 2005, which could be determined only by simulation or by employing machine learning techniques.

In some cases it will be beneficial just to use only the output data set 2005 for determining anomaly of the output data set and possible malware infecting the program 2001.

Figure 10:
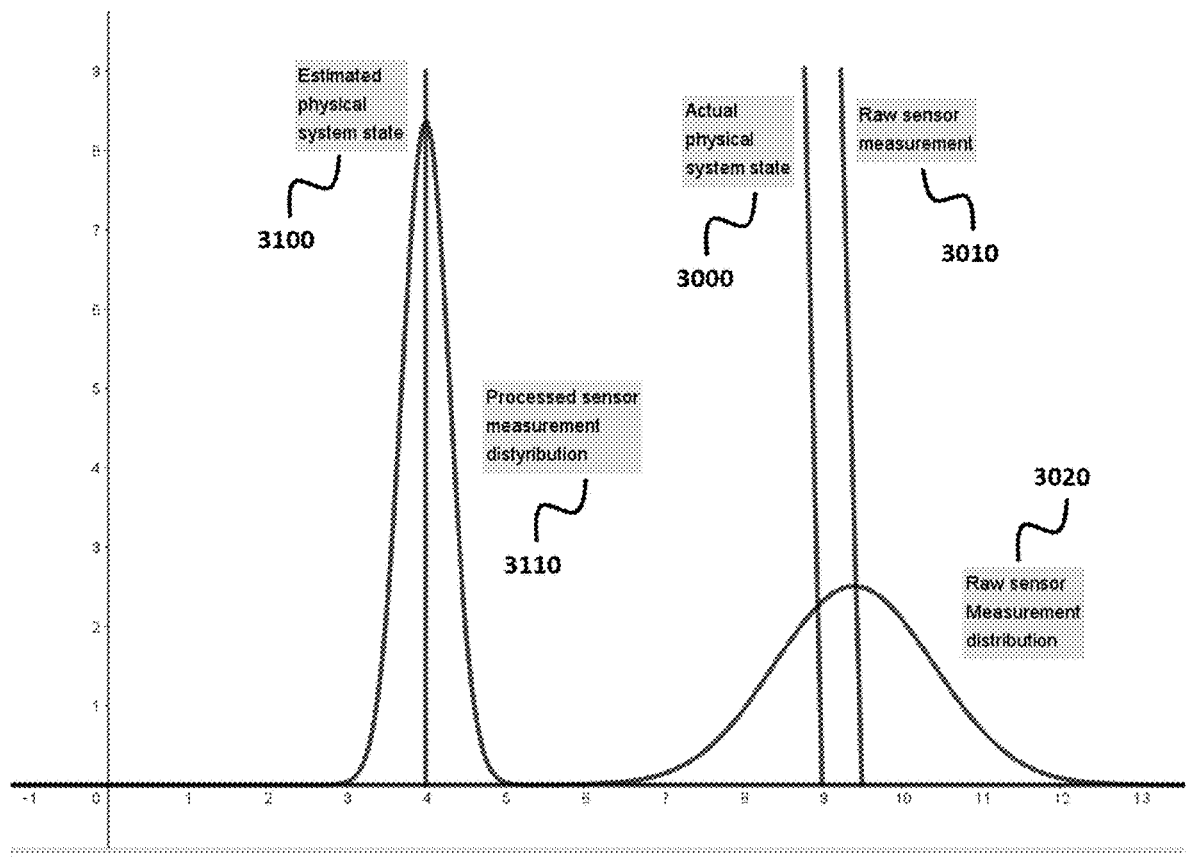
FIG. 10 Example of statistical relation of a sensor data set—measure and processed

FIG. 10 depicts an exemplary two data sets for a sensor— for the purpose for explanation only, since this may apply to any type of sensor, let assume temperature sensor which is used to monitors the state of a nuclear reactor.

This is a simplified and exemplary description that is brought to clarify the meaning of statistical behavior. For someone skilled in the art this might look even naïve description. This is by no means the only approach, as was discussed in this specification—based on the nature of the two data sets, 2004 and 2005, and program 2001 a person skilled in the art will determine what technique to employ to get to the statistical relation between input data set 2004 and output data set 2005.

In FIG. 10 the Actual physical system state (temperature) 3000 is a value 9.

The sensor measures temperature that is the Raw sensor measurement 3010 about 9.5. The distribution of this measure, based on knowledge of the sensor, varies and has a bias (the 0.5) and assumed Gaussian Raw sensor Measurement distribution 3020. These are exemplary and for specific systems and sensors the proper models are developed.

The program generates an Estimated physical system state 3100 which has, when designed properly, a narrow Gaussian Processed sensor measurement distribution 3110.

Assuming that the program is contaminated with malware that attempts to destroy the nuclear reactor a lower temperature level is generated, an Estimated physical system state 3100 with the value 4.

By evaluating the Raw sensor Measurement 3010 against the Estimated physical system state 3100, based on the distributions 3020 and 3110, the probability of such pairing is determined—if the probability of such pairing of Raw sensor measurement 3010 and Estimated physical system state 3100 is low than the conclusion is that the program fails and this indicate contamination by malware or other failure—in any case the potential failure of the system as whole is avoided by tracing the malfunction to the program that process the Raw sensor measurement 3010 to result the Estimated physical system state 3100.

It should be clear to any person skilled in the art that statistical relation between input data set and output data set may be a one to one pairing, that result from the program process, of an input value to an output value—a functional relation—the output data is a function of the input data. In such cases determining a contaminated program (faulty) will be straightforward. This may be extended to a multiple data input (set) with multiple data output (set).

The inclusion of cases where output data sets may be included, directly or after processing, as part of input data sets, as may be found in feedback processes, where output is used as part of the process. In such cases, at any point in time the statistical relation will be derived from inclusion in the data sets current input data sets and additional data sets portions that will make the statistical relation more coherent and distinct.

One skilled in the art will recognize that the Internet service may be configured to provide Internet access to one or more computing systems that are coupled to the Internet service, and that the computing systems may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A trusted computing system comprising: a first processor and a first memory;
   the first memory stores a first program to be executed by the first processor;
   a second computing system comprising a second processor and a second memory;
   the second memory stores a second program to be executed by the second processor;
   the second computing system receives an input data set;
   the input data set is processed by the second program executed by the second processor, to result an output data set;
   the trusted computing system receives the input data set or the output data set;
   the trusted computing system communicates, the input data set or the output data set, to a third computing system for evaluation or
   carries an evaluation by the first program;
   the evaluation is based on statistical properties and dependency of the input data set and the output data set, where the first program or the third computing system, detects deviations or discrepancies, and determines, based on the evaluation, that the second program is faulty;
   the trusted computing system, by means of the input data set or output data set, carries any of transmitting, monitoring, containing, detecting malware infection, blocking, refreshing, backup operation by means of the input data set, or testing of the second program.

2. A method of detecting a faulty program, the method comprising:
   storing a trusted program to be executed by a processor;
   storing a legacy program to be executed by the processor;
   receiving an input data set by the legacy program processing the input data set by the legacy program executed by the processor, to result an output data set;
   receiving the input data set or the output data set by the trusted program;
   communicating, by the trusted program, the input data set or the output data set to a second computing system for evaluation or carrying an evaluation by the trusted program, wherein the evaluation is based on statistical properties and dependency of the input data set and the output data set;

detecting, by the trusted program or the second computing system, deviations or discrepancies, and determining, based on the evaluation, that the legacy program is faulty;

carrying, by the trusted program, by means of the input data set or output data set, any of transmitting, monitoring, containing, detecting malware infection, blocking, refreshing, backup operation, or testing of the legacy program.

* * * * *